Patented Sept. 5, 1944

2,357,598

UNITED STATES PATENT OFFICE 2,357,598

QUATERNARY COMPOUNDS

Ernst Alfred Mauersberger, New York, N. Y., assignor to Alframine Corporation, New York, N. Y., a corporation of New York No Drawing. Application May 19, 1942, Serial No. 443,642

7 Claims. (Cl. 260—404.5)

My co-pending patent application Ser. No. 331,838, of which the present application is a continuation-in-part and which has matured into U. S. Patent 2,329,406, issued on September 14, 1943, discloses a process for making new water soluble acid addition compounds by reacting certain esters with certain alkylolamides and to the products of such reactions.

I have found that by using the starting materials of application 331,838 in certain predetermined proportions and effecting the reactions at temperatures within certain limits, quaternary compounds are obtained which are clearly soluble in water and stable to weakly alkaline solutions while returning all the advantageous properties of the acid addition compounds.

One object of my present invention is to produce new color fixing and softening agents for textiles and leather which are clearly and completely soluble in cold water without being precipitated by the addition of sulfates or alkaline solutions and which do not produce any undesirable effects on the goods to which they are applied.

Another object of the invention is to produce new emulsifying agents for artificial resins.

Still another object of my invention is to produce water soluble condensation compounds which are stable to alkaline solutions and which can be used as assistants in preshrinking textiles.

According to the present invention I accomplish these and other objects which will become apparent as the description proceeds, generally, by reacting an aliphatic ester of a polyvalent inorganic acid, said ester containing from 1 to 5 carbon atoms in each alcohol radical with a monoalkylolamide polyamine having the general formula $$R.CO.(NR_1.C_xH_{2x})_n.NR_1.C_yH_{2y}.OH$$

in which R represents any aliphatic chain having at least 7 carbon atoms and containing saturated, unsaturated or hydroxyl groups, each $R_1$ represents a hydrogen atom which may be substituted, $x$ and $y$ each represent a number from 2 to 5 inclusive and $n$ represents a number from 1 to 3 inclusive. At least one mol ester is used for each mol alkylolamide and the proportion is so selected that the total number of alkyl groups in the ester exceeds the total number of unreacted NH groups in the alkylolamide. The reaction is effected at temperatures between 100° C. and 160° C. until, after alkylation of all unreacted amino groups, at least one of the $NR_1$ groups has been converted into a quaternary group.

The esters which, according to the invention, are reacted with the alkylolamides are those of the lower aliphatic alcohols, as methylalcohol, ethylalcohol, propylalcohol, butylalcohol and amylalcohol with a polyvalent inorganic acid, such as sulphuric acid or phosphoric acid.

According to one embodiment of my invention the above described esters are condensed with alkylolamides having the general formula $$R.CO.(NH.C_xH_{2x})_n.NH.C_yH_{2y}.OH$$

as obtained from the reaction of any fatty acid having at least 7 carbon atoms in the molecule with a suitable monoalkylol polyamine.

The condensation starts at temperatures above 70° C. when a first alkyl group is split off from the ester and replaces the hydrogen in one of the amino groups. At a temperature above 100° C. and with a sufficient quantity of ester the remaining amino groups are successively alkylated and, eventually, one or more of the nitrogens are converted into pentavalent groups. The resulting compounds have the following general formula $$R.CO.(AC_xH_{2x})_n.A.C_yH_{2y}.OH$$

in which R represents an aliphatic chain having at least 7 carbon atoms and containing saturated, unsaturated or hydroxyl groups, $x$ and $y$ each represent a number from 2 to 5 inclusive, $n$ represents a number from 1 to 3 inclusive, at least one A represents a pentavalent nitrogen group of the type

and each remaining A represents a trivalent nitrogen group of the type

where $R_4$ represents a substituted hydrogen atom, $R_2$ represents an alkyl having 1 to 5 carbon atoms, and $R_3$ is the acid radical of an acid selected from the group consisting of the polyvalent inorganic acids and their acid aliphatic esters containing in each alcohol radical from 1 to 5 carbon atoms.

According to a specific embodiment of my invention, I use as starting materials for the reaction with the specified esters alkylolamides of the type in which one or more of the amino groups have been previously condensed with an aldehyde, as described and claimed in my U. S. Patent 2,186,464.

If an aldehyde condensate is used in which one or more of the amino groups still contain hydrogen atoms, these atoms are first replaced by alkyls. Further continuation of the reaction at higher temperatures results in conversion of one or more of the amino groups into quaternary groups.

If the starting material is an alkylolamide of the type described in which all the amino groups are precondensed with aldehyde, the reaction with the ester yields the corresponding quaternary compound.

Dependent upon the starting materials and temperatures used, the condensates according to the present invention are obtained in concentrated form as oils, pastes or solid masses which, generally, are yellow, brown or red in color. However, the concentrated compounds are easily and clearly soluble in cold water and the aqueous solutions in which they are used for industrial purposes are completely colorless. The concentrates are not precipitated from the solutions by the addition of alkali or sulfates.

The water soluble compounds according to my invention constitute excellent color fixing and softening agents for the textile and leather industry and they are reliable and efficient emulsifying agents for urea-aldehyde condensates and other artificial resins. If the products are used as assistants in pre-shrinking textiles, markedly improved results are obtained.

The following examples will serve to illustrate, without limiting, my invention.

Example 1

413 g. (1 mol) of a condensate of stearic acid with hydroxyethyl diethylene triamine, having the formula $$C_{17}H_{35}.CO.NH.C_2H_4.NH.C_2H_4.NH.C_2H_4.OH$$

are heated to about 90° C. Then 378 g. (3 mol) dimethyl-sulfate are slowly added under thorough stirring and slight cooling, care being taken that the temperature, during the addition of the dimethylsulfate, does not rise above 100° C. As soon as all the dimethylsulfate has been introduced, the temperature is slowly raised under thorough stirring to 140° C. and the mixture is maintained at this temperature in a closed vessel for several hours until the reaction has become complete. The reaction product probably has the following formula

The product is an oily paste which is clearly soluble in cold water and is not precipitated from such solution by the addition of alkalis.

Example 2

413 g. of a condensate of stearic acid and hydroxyethyldiethylenetriamine, according to Example 1, are treated with 462 g. (3 mol) of diethylsulfate at about 90° C. Thereafter, the mass is stirred for approximately four hours at 145° C. and then it is cooled.

The reaction product probably has the following formula

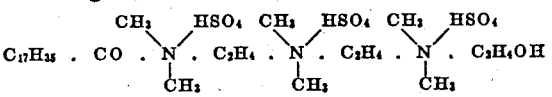

The product has a somewhat greater solidity than that of Example 1, but is equally water-soluble.

Example 3

382 g. (1 mol) of a condensate obtained from oleic acid and hydroxypropyl ethylenediamine, which has the formula $$C_{17}H_{33}.CO.NH.C_2H_4.NH.C_3H_6OH$$

is treated with 182 g. triethyl phosphate which is slowly stirred into the molten condensate. During the introduction of the triethyl phosphate the mixture is sufficiently cooled to prevent rising of the temperature above 90° C. After addition of the entire quantity of the triethyl phosphate the temperature is raised to 160° C. The mixture is held at this temperature for several hours and is then cooled.

The reaction product probably has the following formula

Example 4

385 g. of a condensate of castor oil fatty acid and hydroxyethylenediamine is first condensed with 38 g. of a 40% formaldehyde solution substantially as described in Example 5 of my U. S. Patent 2,186,464.

The product obtained, in which only one amino group in each alkylolamide molecule is condensed with aldehyde, is then mixed with 182 g. triethyl phosphate which is slowly stirred into the molten condensate under sufficient cooling to prevent rising of the temperature above 90° C. After the triethyl phosphate has been completely stirred in, the temperature is raised to 130° C. and the mixture is held at this temperature for several hours.

The reaction product probably has the following formula

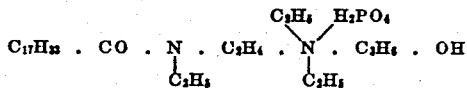

Example 5

385 g. of a condensate of castor oil fatty acid and hydroxyethylethylenediamine is first condensed with 75 g. of a 40% formaldehyde solution substantially as described in Example 5 of my U. S. Patent 2,186,464.

The product obtained in which all the amino groups are condensed with aldehyde is then mixed with 154 g. diethylsulfate. The reaction mixture is heated to 150° C. and is maintained at this temperature for several hours. The product is clearly soluble in water.

Example 6

399 g. of a condensate of castor oil and hydroxypropylethylenediamine are first treated with 75 g. of a 40% formaldehyde solution substantially as described in Example 6 of my U. S. Patent 2,186,464. Thereafter, 308 g. diethylsulfate are introduced at a temperature between 80° and 90° C. After complete incorporation of the diethylsulfate the reaction mixture is heated to 140°

C. and maintained at this temperature for 4 hours.

The reaction product probably has the following formula

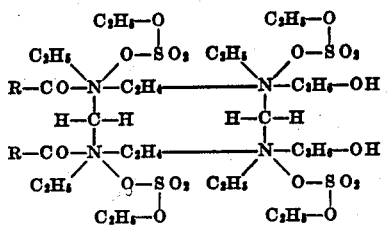

A side reaction may also produce the following compound

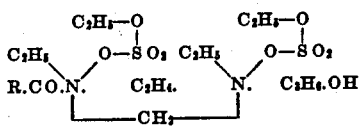

I claim:

1. A process for producing clearly water soluble condensation products suitable as color fixing, softening and emulsifying agents, which process comprises the steps of mixing at least one mol of an aliphatic ester of a polyvalent inorganic acid, said ester containing in each alcohol radical from 1 to 5 carbon atoms, with one mol of a monoalkylol amide polyamide having the general formula $$R.CO.(NR_1.C_xH_{2x})_n.NR_1.C_yH_{2y}.OH$$

in which R represents any aliphatic chain having at least 7 carbon atoms, each $R_1$ represents a member of the group consisting of hydrogen and its alkyl substituents, $x$ and $y$ each represent a number from 2 to 5 inclusive and $n$ represents a number from 1 to 3 inclusive, the proportion of the ester to the alkylolamide being so chosen that the total number of alkyl groups in the ester exceeds the total number of unreacted NH groups in the alkylolamide, and reacting this mixture at temperatures between 100° C. and 160° C. until at least one of the nitrogen atoms has been converted to its quaternary form.

2. A process for producing clearly water soluble condensation products suitable as color fixing softening and emulsifying agents, which process comprises the steps of mixing at least one mol of an aliphatic ester of a polyvalent inorganic acid, said ester containing in each alcohol radical from 1 to 5 carbon atoms, with one mol of a monoalkylol amide polyamine having the general formula $$R.CO.(NR_1.C_xH_{2x})_n.NR_1.C_yH_{2y}.OH$$

in which R represents any aliphatic chain having at least 7 carbon atoms, $x$ and $y$ each represent a number from 2 to 5 inclusive, $n$ represents a number from 1 to 3 inclusive, $R_1$ represents a member of the group consisting of hydrogen and its alkyl substituents, at least one $R_1$ being hydrogen, the proportion of the ester to the alkylolamide being so chosen that the total number of alkyl groups in the ester exceeds the total number of unreacted NH groups in the alkylolamide, and reacting the mixture at temperatures between 100° C. and 160° C. until, after alkylation of all unreacted amino groups, at least one nitrogen atom has been converted to its quaternary form.

3. A process for producing clearly water soluble condensation products suitable as color fixing, softening and emulsifying agents, which process comprises the steps of mixing at least one mol of an aliphatic ester of a polyvalent inorganic acid, said ester containing in each alcohol radical from 1 to 5 carbon atoms, with one mol of a monoalkylol amide polyamine having the general formula $$R.CO.(NR_1.C_xH_{2x})_n.NR_1.C_yH_{2y}.OH$$

in which R represents any aliphatic chain having at least 7 carbon atoms, each $R_1$ represents an alkyl radical, $x$ and $y$ each represent a number from 2 to 5 inclusive and $n$ represents a number from 1 to 3 inclusive, and reacting this mixture at temperatures between 100° C. and 160° C. until at least one of the nitrogen atoms has been converted to its quaternary form.

4. A process for producing clearly water soluble condensation products suitable as color fixing, softening and emulsifying agents, which process comprises the steps of mixing at least one mol of an aliphatic ester of a polyvalent inorganic acid, said ester containing in each alcohol radical from 1 to 5 carbon atoms, with one mol of an alkylolamide obtained from reacting at elevated temperatures an aliphatic aldehyde containing 1 to 5 carbon atoms in the molecule with a compound of the general formula $$R.CO.(NH.C_xH_{2x})_n.NH.C_yH_{2y}.OH$$

in which R represents any aliphatic chain having at least 7 carbon atoms, $x$ and $y$ each represent a number from 2 to 5 inclusive and $n$ represents a number from 1 to 3 inclusive, the proportion of the ester to the alkylolamide being so chosen that the total number of alkyl groups in the ester exceeds the total number of unreacted NH groups in the alkylolamide, and reacting said ester with said alkylolamide at temperatures between 100° C. and 160° C. until at least one of the nitrogen atoms has been converted to its quaternary form.

5. As a new water soluble color fixing, softening and emulsifying agent, a condensation product having the general formula $$R.CO.(AC_xH_{2x})_n.A.C_yH_{2y}.OH$$

in which R represents any aliphatic chain having at least 7 carbon atoms, $x$ and $y$ each represent a number from 2 to 5 inclusive, $n$ represents a number from 1 to 3 inclusive, at least one A represents a pentavalent nitrogen group having the general formula

and each remaining A represents a trivalent nitrogen group having the general formula

where $R_4$ represents an alkyl radical, $R_2$ represents an alkyl having 1 to 5 carbon atoms, and $R_3$ is the acid radical of an acid selected from the group consisting of the polyvalent inorganic acids and their acid aliphatic esters containing in each alcohol radical from 1 to 5 carbon atoms.

6. A product as claimed in claim 5, in which at least one $R_4$ represents a hydrogen atom which has been condensed with an aliphatic aldehyde having between 1 and 5 carbon atoms in the molecule.

7. A product as claimed in claim 5, in which each A represents a pentavalent nitrogen group.

ERNST ALFRED MAUERSBERGER.